United States Patent
Yamaguchi et al.

(10) Patent No.: US 11,422,007 B2
(45) Date of Patent: Aug. 23, 2022

(54) MAGNETIC SENSOR INCLUDING SENSOR ELEMENTS OF BRIDGE CIRCUITS ARRANGED ALONG A PARTIAL CIRCLE CIRCUMFERENCE ABOUT A CENTER OF THE SENSOR ELEMENTS

(71) Applicant: KABUSHIKI KAISHA TOKAI RIKA DENKI SEISAKUSHO, Aichi (JP)

(72) Inventors: Tatsuyuki Yamaguchi, Aichi (JP); Kazuhiro Kitada, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 17/204,000

(22) Filed: Mar. 17, 2021

(65) Prior Publication Data

US 2021/0302202 A1 Sep. 30, 2021

(30) Foreign Application Priority Data

Mar. 24, 2020 (JP) .............................. JP2020-052320

(51) Int. Cl.
*G01D 5/16* (2006.01)
(52) U.S. Cl.
CPC ...................... *G01D 5/16* (2013.01)
(58) Field of Classification Search
CPC ............ G01D 5/12; G01D 5/14–1655; G01D 5/244–2497; G01R 33/0005; G01R 33/02; G01R 33/06; G01R 33/09–098
See application file for complete search history.

(56) References Cited

U.S. PATENT DOCUMENTS

| | | | | | |
|---|---|---|---|---|---|
| 4,053,829 | A | * | 10/1977 | Maruo | G01D 5/145 324/260 |
| 7,064,537 | B2 | * | 6/2006 | Sudo | G01D 5/145 324/207.21 |
| 7,834,616 | B2 | * | 11/2010 | Stolfus | G01P 13/045 324/174 |

(Continued)

FOREIGN PATENT DOCUMENTS

JP 2011-027495 A 2/2011

*Primary Examiner* — Huy Q Phan
*Assistant Examiner* — David B Frederiksen
(74) *Attorney, Agent, or Firm* — Greenblum & Bernstein, P.L.C.

(57) ABSTRACT

A magnetic sensor includes first and second bridge circuits. The first bridge circuit includes a first group of magnetoresistive elements connected in a bridge. The first bridge circuit outputs a first detection signal corresponding to a magnetic field detected by the magnetoresistive elements in the first group. The second bridge circuit includes a second group of magnetoresistive elements connected in a bridge. Each magnetoresistive element of the first and second bridge circuits is formed by a sensor element bent in a serpentine manner. The second bridge circuit outputs a second detection signal corresponding to a magnetic field detected by the magnetoresistive elements in the second group and having a waveform that has a sine-cosine relationship with the first detection signal. The sensor elements of the first and second bridge circuits are arranged along a circumference of part of a circle about a center of the sensor elements.

5 Claims, 5 Drawing Sheets

(56) References Cited

U.S. PATENT DOCUMENTS

| | | | |
|---|---|---|---|
| 9,091,565 B2 * | 7/2015 | Kawano | G01D 5/2451 |
| 2006/0136169 A1 * | 6/2006 | Shonai | G01D 3/022 |
| | | | 702/145 |
| 2011/0018531 A1 | 1/2011 | Ishizaki | |
| 2012/0119729 A1 * | 5/2012 | Komasaki | B82Y 25/00 |
| | | | 324/207.21 |
| 2013/0328556 A1 * | 12/2013 | Granig | G01R 33/091 |
| | | | 324/252 |
| 2018/0202837 A1 * | 7/2018 | French | G01D 5/145 |
| 2019/0072620 A1 * | 3/2019 | Ishizaki | H01L 43/08 |

* cited by examiner

MAGNETIC SENSOR INCLUDING SENSOR ELEMENTS OF BRIDGE CIRCUITS ARRANGED ALONG A PARTIAL CIRCLE CIRCUMFERENCE ABOUT A CENTER OF THE SENSOR ELEMENTS

BACKGROUND

1. Field

The following description relates to a magnetic sensor that detects a magnetic field.

2. Description of Related Art

One type of position detector is a rotation detector using a magnetic sensor including four magnetoresistive elements that are bridged (refer to Japanese Laid-Open Patent Publication No. 2011-027495). In the magnetic sensor, the resistance changes in accordance with the magnetic field applied to the magnetoresistive elements, and detection signals are output in accordance with the detected magnetic field. Such a magnetic sensor is used to, for example, detect the switching of a detected body between two positions (on-position, off-position) or detect the linear position of a detected body. There is a need for improving the detection accuracy of the position detector that uses such a magnetic sensor.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a magnetic sensor includes a first bridge circuit and a second bridge circuit. The first bridge circuit includes a first group of magnetoresistive elements that are connected in a bridge. The magnetoresistive elements are each formed by a sensor element bent in a serpentine manner. The first bridge circuit outputs a first detection signal corresponding to a magnetic field detected by the magnetoresistive elements in the first group. The second bridge circuit includes a second group of magnetoresistive elements that are connected in a bridge. The magnetoresistive elements are each formed by a sensor element bent in a serpentine manner. The second bridge circuit outputs a second detection signal corresponding to a magnetic field detected by the magnetoresistive elements in the second group, the second detection signal having a waveform that has a sine-cosine relationship with the first detection signal. The sensor elements of the first bridge circuit and the sensor elements of the second bridge circuit are arranged along a circumference of part of a circle about a center of the sensor elements.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A first embodiment of a magnetic sensor will now be described with reference to FIGS. 1 to 5.

Figure 1:
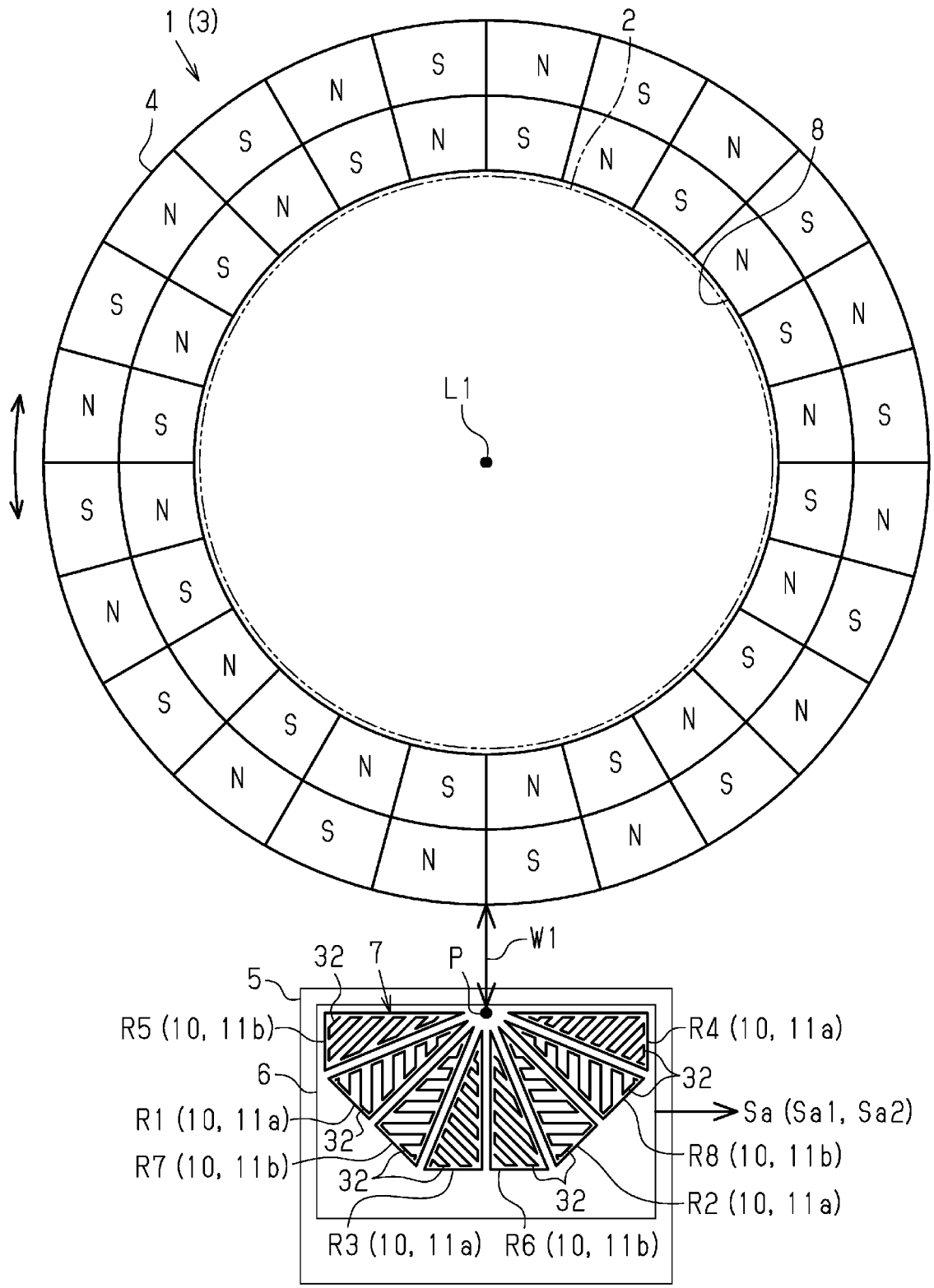
FIG. 1 is a diagram showing the structure of a position detector in accordance with a first embodiment.

As shown in FIG. 1, a position detector 1 is a rotation detector 3 that detects the position (rotation position) of a rotated detected body 2. The rotation detector 3 includes a magnet 4 and a sensor integrated circuit (IC) 6. The magnet 4 is rotated integrally with the detected body 2. The sensor IC 6 is arranged on a substrate 5. The sensor IC 6 includes a magnetic sensor 7 that detects the magnetic field applied by the magnet 4. The magnet 4 is, for example, disc-shaped and concentric with the detected body 2. The magnetic poles of the magnet 4 are set so that north poles and south poles are alternately arranged in a circumferential direction. The detected body 2 is fitted to a hole 8 and fixed the annular magnet 4 to be rotatable integrally with the magnet 4.

The magnetic sensor 7 is located at a radially outer side of the detected body 2. Thus, the magnetic sensor 7 is disposed beside the magnet 4 (outer circumferential surface of magnet 4) in the radial direction of the magnet 4. That is, the magnetic sensor 7 is transverse to the magnet 4. Rotation of the detected body 2 and the magnet 4 about axis L1 changes a direction of the magnetic field (direction in which magnetic field extends) applied by the magnet 4 to the magnetic sensor 7. The magnetic sensor 7 detects changes in the direction of the magnetic field applied by the magnet 4 and outputs a detection signal Sa corresponding to the detected direction of the magnetic field.

The magnetic sensor 7 includes bridge pairs 10. Each bridge pair 10 includes bridge circuits 11 in which magnetoresistive elements Rm are connected in a full-bridge. In the present example, each bridge pair 10 includes two bridge circuits 11, namely, a first bridge circuit 11a and a second bridge circuit 11b. The first bridge circuit 11a and the second bridge circuit 11b each output a detection signal Sa. The detection signal Sa of the first bridge circuit 11a and the detection signal Sa of the second bridge circuit 11b have a sine-cosine relationship.

Figure 2:
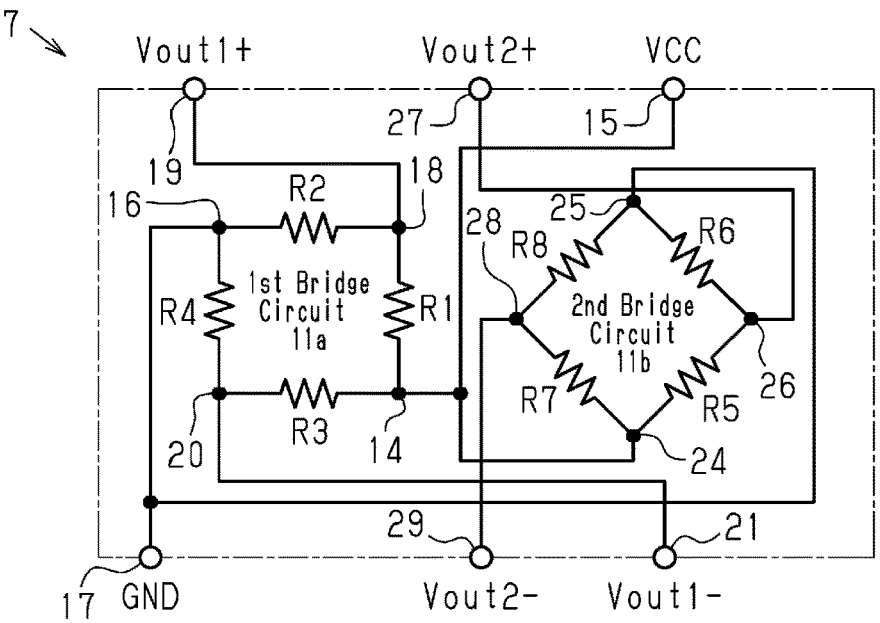
FIG. 2 is a circuit diagram of a magnetic sensor.

As shown in FIG. 2, in the first bridge circuit 11a, four elements, namely, a first magnetoresistive element R1, a second magnetoresistive element R2, a third magnetoresistive element R3, and a fourth magnetoresistive element R4 are connected in a full-bridge. In the second bridge circuit 11b, four elements, namely, a fifth magnetoresistive element R5, a sixth magnetoresistive element R6, a seventh magnetoresistive element R7, and an eighth magnetoresistive element R8 are connected in a full-bridge. The first bridge circuit 11a and the second bridge circuit 11b are arranged to have phases that are offset from each other by forty-five degrees. The first magnetoresistive element R1, the second magnetoresistive element R2, the third magnetoresistive element R3, and the fourth magnetoresistive element R4 form a first group of the magnetoresistive elements Rm. Further, the fifth magnetoresistive element R5, the sixth magnetoresistive element R6, the seventh magnetoresistive element R7, and the eighth magnetoresistive element R8 form a second group of the magnetoresistive elements Rm.

In the first bridge circuit 11a, an intermediate point 14 of the first magnetoresistive element R1 and the third magnetoresistive element R3 is connected to a terminal 15 of a power supply Vcc, and an intermediate point 16 of the second magnetoresistive element R2 and the fourth magnetoresistive element R4 is connected to a grounded terminal 17. An intermediate point 18 of the first magnetoresistive element R1 and the second magnetoresistive element R2 is connected to a first positive output terminal 19, at which a positive output is obtained for detecting the magnetic field of the first bridge circuit 11a. An intermediate point 20 of the third magnetoresistive element R3 and the fourth magnetoresistive element R4 is connected to a first negative output terminal 21, at which a negative output is obtained for detecting the magnetic field of the first bridge circuit 11a. The first bridge circuit 11a outputs the potential difference between the first positive output terminal 19 and the first negative output terminal 21 as a detection signal Sa (first detection signal Sa1 in the present example) corresponding to the detected magnetic field.

In the second bridge circuit 11b, an intermediate point 24 of the fifth magnetoresistive element R5 and the seventh magnetoresistive element R7 is connected to the terminal 15 of the power supply Vcc, and an intermediate point 25 of the sixth magnetoresistive element R6 and the eighth magnetoresistive element R8 is connected to the grounded terminal 17. An intermediate point 26 of the fifth magnetoresistive element R5 and the sixth magnetoresistive element R6 is connected to a second positive output terminal 27, at which a positive output is obtained for detecting the magnetic field of the second bridge circuit 11b. An intermediate point 28 of the seventh magnetoresistive element R7 and the eighth magnetoresistive element R8 is connected to a second negative output terminal 29, at which a negative output is obtained for detecting the magnetic field of the second bridge circuit 11b. The second bridge circuit 11b outputs the potential difference between the second positive output terminal 27 and the second negative output terminal 29 as a detection signal Sa (second detection signal Sa2 in the present example) corresponding to the magnetic field.

Figure 3:
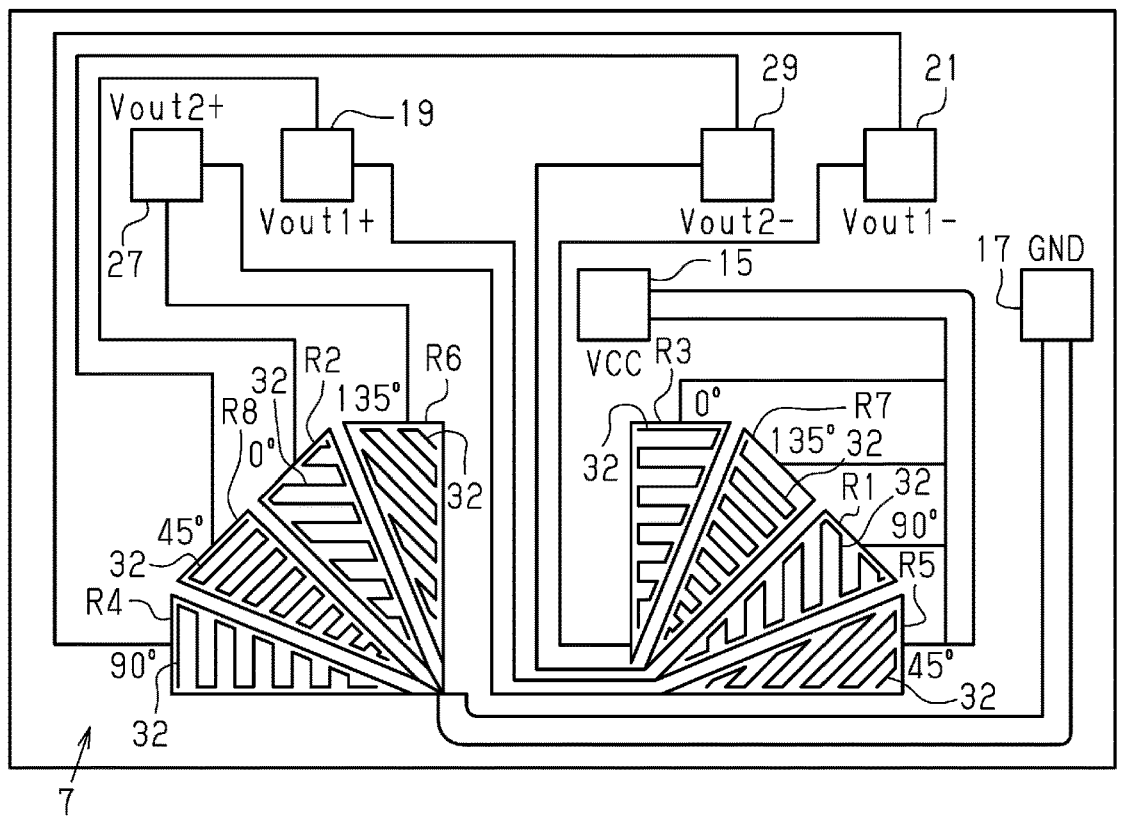
FIG. 3 is a diagram showing the layout of sensor elements of the magnetic sensor shown in FIG. 2.

As shown in FIG. 3, each magnetoresistive element Rm of the first bridge circuit 11a and the second bridge circuit 11b includes a sensor element 32 that is bent in alternating directions. The magnetoresistive elements Rm of the first bridge circuit 11a and the second bridge circuit 11b are arranged in equal intervals about element center P in the circumferential direction. The sensor element 32 is bent, for example, in a serpentine manner so as to form a sensor pattern that is bent in alternating directions a multiple number of times.

The first magnetoresistive element R1 to the eighth magnetoresistive element R8 are arranged about the center of the sensor patterns of the sensor element 32, or the element center P (refer to FIG. 1), along part of a circle in the circumferential direction. In the present example, the first magnetoresistive element R1 to the eighth magnetoresistive element R8 are arranged along an arc, that is, the circumference of a semicircle. In this manner, in the present example, the sensor elements 32 of the first magnetoresistive element R1 to the eighth magnetoresistive element R8 are arranged about the element center P along the circumference of part of a circle. Specifically, the sensor elements 32 of the present example are arranged along a semicircle about the element center P.

The second magnetoresistive element R2 is inclined by ninety degrees relative to the first magnetoresistive element R1 about the element center P. The first magnetoresistive element R1 and the second magnetoresistive element R2 are positioned so that the inclination angle therebetween about the element center P is ninety degrees. Further, the sensor pattern of the first magnetoresistive element R1 is oriented in a direction inclined by ninety degrees from the sensor pattern of the second magnetoresistive element R2 so that the pattern arrangement of the sensor element 32 of the first magnetoresistive element R1 is orthogonal to the pattern arrangement of the sensor element 32 of the second magnetoresistive element R2. The third magnetoresistive element R3 and the fourth magnetoresistive element R4 are arranged in the same manner. The third magnetoresistive element R3 is inclined by forty-five degrees relative to the first magnetoresistive element R1 about the element center P. The first magnetoresistive element R1 and the third magnetoresistive element R3 are positioned so that the inclination angle therebetween about the element center P is forty-five degrees. Further, the sensor pattern of the first magnetoresistive element R1 is oriented in a direction inclined by ninety degrees from the sensor pattern of the third magnetoresistive element R3 so that the pattern arrangement of the sensor element 32 of the first magnetoresistive element R1 is orthogonal to the pattern arrangement of the sensor element 32 of the third magnetoresistive element R3. The second magnetoresistive element R2 and the fourth magnetoresistive element R4 are arranged in the same manner.

In this manner, in the first magnetoresistive element R1 to the fourth magnetoresistive element R4, the first magnetoresistive element R1 and the third magnetoresistive element R3 are inclined by forty-five degrees relative to each other, the second magnetoresistive element R2 and the third magnetoresistive element R3 are inclined by forty-five degrees relative to each other, and the second magnetoresistive element R2 and the fourth magnetoresistive element R4 are inclined by forty-five degrees relative to each other. Further, as viewed in FIG. 3, the first magnetoresistive element R1 and the third magnetoresistive element R3 are arranged in the right half of the semicircle, and the second magnetoresistive element R2 and the fourth magnetoresistive element R4 are arranged in the left half of the semicircle.

The fifth magnetoresistive element R5 is inclined by ninety degrees relative to the sixth magnetoresistive element R6 about the element center P. The fifth magnetoresistive element R5 and the sixth magnetoresistive element R6 are positioned so that the inclination angle therebetween about the element center P is ninety degrees. Further, the sensor pattern of the fifth magnetoresistive element R5 is oriented in a direction inclined by ninety degrees from the sensor pattern of the sixth magnetoresistive element R6 so that the pattern arrangement of the sensor element 32 of the fifth magnetoresistive element R5 is orthogonal to the pattern arrangement of the sensor element 32 of the sixth magnetoresistive element R6. The seventh magnetoresistive element R7 and the eighth magnetoresistive element R8 are arranged in the same manner. The fifth magnetoresistive element R5 is inclined by forty-five degrees relative to the seventh magnetoresistive element R7 about the element center P. The fifth magnetoresistive element R5 and the seventh magnetoresistive element R7 are positioned so that the inclination angle therebetween about the element center P is forty-five degrees. Further, the sensor pattern of the fifth magnetoresistive element R5 is oriented in a direction inclined by ninety degrees from the sensor pattern of the seventh magnetoresistive element R7 so that the pattern arrangement of the sensor element 32 of the fifth magnetoresistive element R5 is orthogonal to the pattern arrangement of the sensor element 32 of the seventh magnetoresistive element R7. The sixth magnetoresistive element R6 and the eighth magnetoresistive element R8 are arranged in the same manner.

In this manner, in the fifth magnetoresistive element R5 to the eighth magnetoresistive element R8, the fifth magnetoresistive element R5 and the seventh magnetoresistive element R7 are inclined by forty-five degrees relative to each other, the sixth magnetoresistive element R6 and the seventh magnetoresistive element R7 are inclined by forty-five degrees relative to each other, and the sixth magnetoresistive element R6 and the eighth magnetoresistive element R8 are inclined by forty-five degrees relative to each other. Further, as viewed in FIG. 3, the fifth magnetoresistive element R5 and the seventh magnetoresistive element R7 are arranged in the right half of the semicircle, and the sixth magnetoresistive element R6 and the eighth magnetoresistive element R8 are arranged in the left half of the semicircle.

Furthermore, in the magnetic sensor 7, the first magnetoresistive element R1 is located between the fifth magnetoresistive element R5 and the seventh magnetoresistive element R7, and the seventh magnetoresistive element R7 is located between the first magnetoresistive element R1 and the third magnetoresistive element R3. In the magnetic sensor 7, the eighth magnetoresistive element R8 is located between the second magnetoresistive element R2 and the fourth magnetoresistive element R4, and the second magnetoresistive element R2 is located between the sixth magnetoresistive element R6 and the eighth magnetoresistive element R8.

In this manner, the sensor elements 32 of the first bridge circuit 11a and the sensor elements 32 of the second bridge circuit 11b are alternately arranged about the element center P. In other words, the sensor elements 32 of the first bridge circuit 11a and the sensor elements 32 of the second bridge circuit 11b are alternately positioned about the element center P. In the present example, the first magnetoresistive element R1 to the eighth magnetoresistive element R8 are arranged counterclockwise about the element center P in the order of the fifth magnetoresistive element R5, the first magnetoresistive element R1, the seventh magnetoresistive element R7, the third magnetoresistive element R3, the sixth magnetoresistive element R6, the second magnetoresistive element R2, the eighth magnetoresistive element R8, and the fourth magnetoresistive element R4. Each magnetoresistive element is inclined by 22.5 degrees from the adjacent magnetoresistive element.

Figure 4:
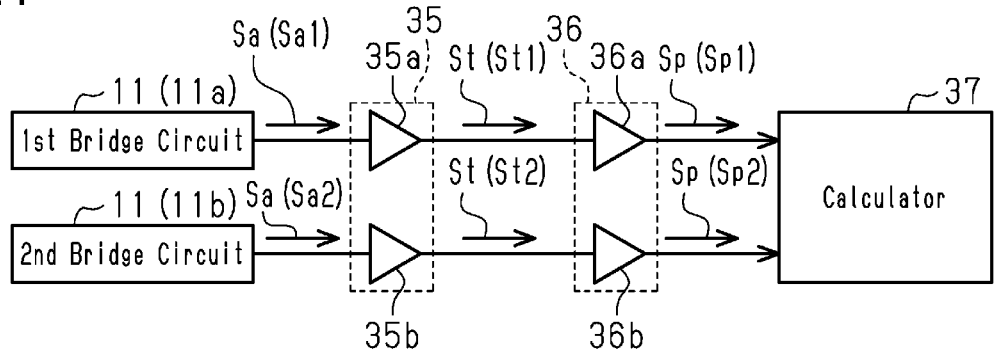
FIG. 4 is a block diagram showing the electrical structure of the position detector shown in FIG. 1.

As shown in FIG. 4, the rotation detector 3 includes an amplifier 35, a comparator 36, and a calculator 37. The amplifier 35 includes a first amplifier 35a and a second amplifier 35b. The first amplifier 35a amplifies the first detection signal Sa1 output from the first bridge circuit 11a. The second amplifier 35b amplifies the second detection signal Sa2 output from the second bridge circuit 11b. The amplifier 35 outputs amplified signals St to the comparator 36. In the present example, the first amplifier 35a generates a first amplified signal St1 by, for example, amplifying the sine wave of the first detection signal Sa1. The second amplifier 35b generates a second amplified signal St2 by, for example, amplifying the cosine wave of the second detection signal Sa2. The first amplified signal St1 and the second amplified signal St2 are generated as signals of which the waveforms have a sine-cosine relationship.

The comparator 36 includes a first comparator 36a and a second comparator 36b. The first comparator 36a performs a comparison with the first amplified signal St1 that has alternating waves and is output from the first amplifier 35a, and the second comparator 36b performs a comparison with the second amplified signal St2 that has alternating waves and is output from the second amplifier 35b. In an example, the first comparator 36a compares the first amplified signal St1, which has alternating waves and is output from the first amplifier 35a, with a first predetermined threshold value, and the second comparator 36b compares the second amplified signal St2, which has alternating waves and is output from the second amplifier 35b, with a second predetermined threshold value. The first comparator 36a and the second comparator 36b each output a pulse signal Sp having rectangular waves as a compared signal. The phase of a first pulse signal Sp1 of the first comparator 36a is offset from the phase of a second pulse signal Sp2 of the second comparator 36b by a predetermined amount (e.g. ¼ cycle).

The calculator 37 detects the rotation (angle, rotational amount, rotational direction, and the like) of the detected body 2 from the pulse signals Sp, which have rectangular waves and are output from the comparator 36. The calculator 37 detects the rotation of the detected body 2 from the first pulse signal Sp1, which is received from the first comparator 36a, and the second pulse signal Sp2, which is received from the second comparator 36b. In an example, the calculator 37 calculates the angle of the detected body 2, for example, by counting the pulses in the rectangular waves of first pulse signal Sp1 and second pulse signal Sp2. Moreover, the calculator 37 calculates the rotational direction of the detected body 2 from the combination of rising and falling edges of the pulses in the rectangular waves.

The operation of the magnetic sensor 7 in accordance with the present embodiment will now be described in comparison with a rotation detector of a comparative example.

Figure 5:
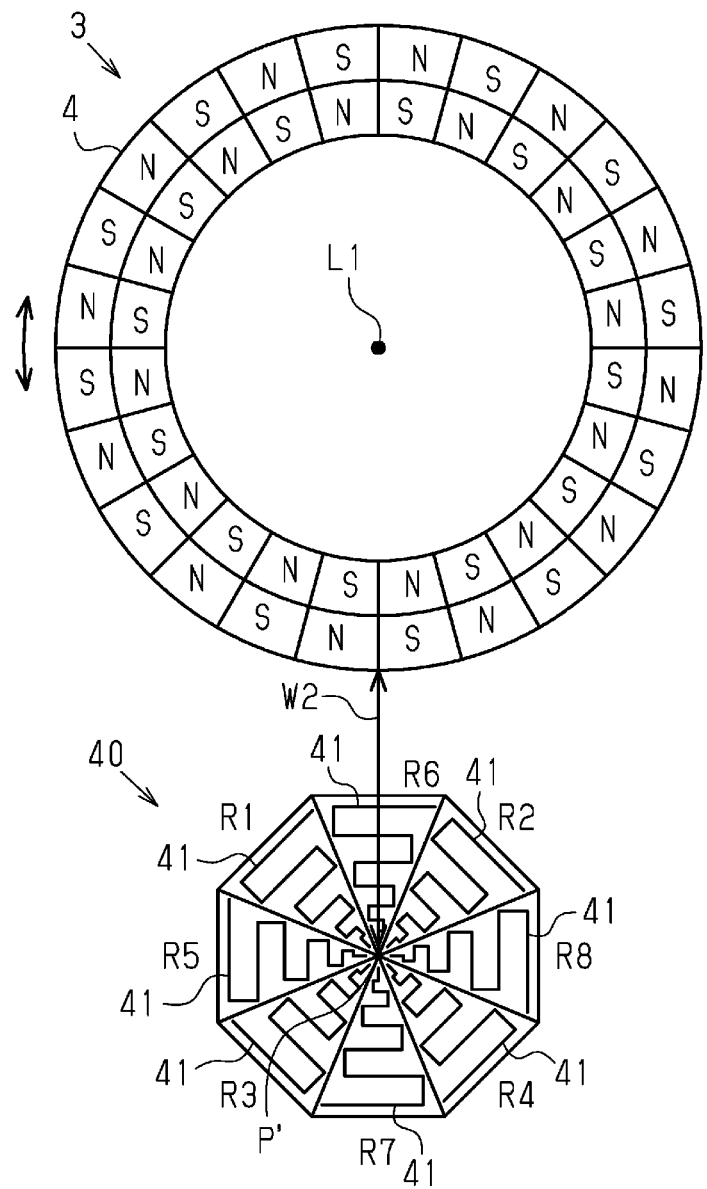
FIG. 5 is a diagram showing the structure of a comparative example magnetic sensor.

FIG. 5 shows the rotation detector 3 of a comparative example. In a magnetic sensor 40 of the comparative example, sensor elements 41 of the magnetoresistive elements Rm are arranged in equal intervals about an element center P' along the entire circumference of a circle. Thus, the distance W2 from the element center P' of the magnetic sensor 40 to the magnet 4 is greater than the distance W1 from the element center P of the magnetic sensor 7 in accordance with the present embodiment to the magnet 4. This hinders the application of a strong magnetic field by the magnet 4 to the entire magnetic sensor 40 and lowers the angle detection accuracy.

In the present example, as shown in FIG. 1, the magnetic sensor 7 is disposed beside the magnet 4 in the radial direction of the magnet 4 so that the element center P is as close as possible to the magnet 4. Thus, in comparison with the magnetic sensor 40 of the comparative example shown in FIG. 5, the magnetic sensor 7 is located closer to the magnet 4 so that the distance between the magnetic sensor 7 and the magnet 4 is W1, where W1 is a value less than W2. In this manner, in the present embodiment, a strong magnetic field can be applied by the magnet 4 to the magnetic sensor 7. This improves the detection accuracy when detecting the rotation of the detected body 2 with the magnetic sensor 7.

The magnetic sensor 7 of the first embodiment has the following advantages.

(1) The magnetic sensor 7 includes the first bridge circuit 11a and the second bridge circuit 11b. In the first bridge circuit 11a, the sensor elements 32 of the magnetoresistive elements Rm are bent in a serpentine manner, and the magnetoresistive elements Rm are connected in a bridge. The first bridge circuit 11a outputs a first detection signal Sa1 corresponding to the magnetic field detected by the magnetoresistive elements Rm in the first group (first magnetoresistive element R1 to fourth magnetoresistive element R4 in the present example). In the second bridge circuit 11b, the sensor elements 32 of the magnetoresistive elements Rm are bent in a serpentine manner, and the magnetoresistive elements Rm are connected in a bridge. The second bridge circuit 11b outputs a second detection signal Sa2 corresponding to the magnetic field detected by the magnetoresistive elements Rm in the second group (fifth magnetoresistive element R5 to eighth magnetoresistive element R8 in the present example). The second bridge circuit 11b outputs the second detection signal Sa2 of which the waveform has a sine-cosine relationship with the waveform of the first detection signal Sa1. The sensor elements 32 of the first bridge circuit 11a and the second bridge circuit 11b are arranged about the element center P along the circumference of part of a circle.

The structure of the present example allows the element center P of the magnetic sensor 7 to be closer to the magnet 4 than when the sensor elements 32 of the magnetic sensor 7 are arranged about the element center P along the entire circumference. This allows the magnet 4 to apply a strong magnetic field to the magnetic sensor 7 and improves the position detection accuracy of the position detector 1.

(2) The sensor elements 32 of the first bridge circuit 11a and the sensor elements 32 of the second bridge circuit 11b are alternately arranged about the element center P. This reduces the difference between the magnetic field applied to the sensor elements 32 of the first bridge circuit 11a and the magnetic field applied to the sensor elements 32 of the second bridge circuit 11b and further improves the position detection accuracy.

(3) The sensor elements 32 of the first bridge circuit 11a and the second bridge circuit 11b are arranged about the element center P along the circumference of a semicircle. This allows the element center P of the magnetic sensor 7 to be as close as possible to the magnet 4. Thus, a strong magnetic field can be applied to the magnetic sensor 7, and further improves the position detection accuracy.

Second Embodiment

A second embodiment will now be described with reference to FIG. 6. The second embodiment is an example in which the arrangement pattern of the sensor elements 32 of the magnetic sensor 7 is modified from that of the first embodiment. Therefore, same reference numerals are given to those components that are the same as the corresponding components of the first embodiment. Such components will not be described in detail, and the description will focus on only the differences.

Figure 6:
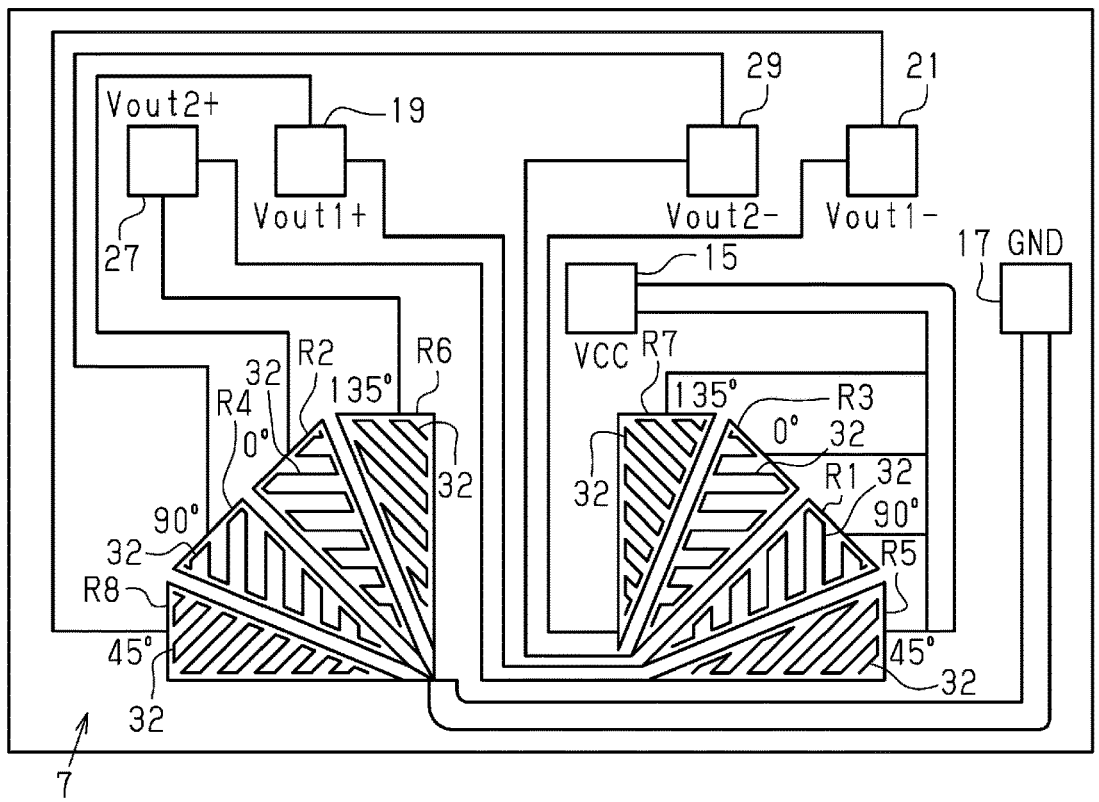
FIG. 6 is a diagram showing the layout of sensor elements in a magnetic sensor in accordance with a second embodiment.

As shown in FIG. 6, the sensor elements 32 of the first bridge circuit 11a and the second bridge circuit 11b are arranged to have a common centroid. Specifically, in the magnetic sensor 7, the sensor elements 32 are arranged about the middle point of the sensor patterns (sideward direction in FIG. 6) with respect to a widthwise direction so that the sensor elements 32 have a common centroid.

In the present example, the first to eighth magnetoresistive elements R1 to R8 are arranged in the clockwise direction about the element center P in the order of the eighth magnetoresistive element R8, the fourth magnetoresistive element R4, the second magnetoresistive element R2, the sixth magnetoresistive element R6, the seventh magnetoresistive element R7, the third magnetoresistive element R3, the first magnetoresistive element R1, and the fifth magnetoresistive element R5. This cancels the property gradient and chip stress in a wafer surface of the sensor IC 6. Thus, the detection accuracy of the magnetic sensor 7 is improved.

The magnetic sensor 7 of the second embodiment has the following advantage in addition to advantages (1) to (3) of the first embodiment.

(4) The sensor elements 32 of the first bridge circuit 11a and the second bridge circuit 11b are arranged in a pattern having a common centroid. The arrangement of the sensor elements 32 of the first bridge circuit 11a and the second bridge circuit 11b of the magnetic sensor 7 having a common centroid improves the detection accuracy of the magnetic sensor 7.

Third Embodiment

A third embodiment will now be described with reference to FIGS. 7 and 8. The description of the third embodiment will also focus on only the differences from the first and second embodiments.

Figure 7:
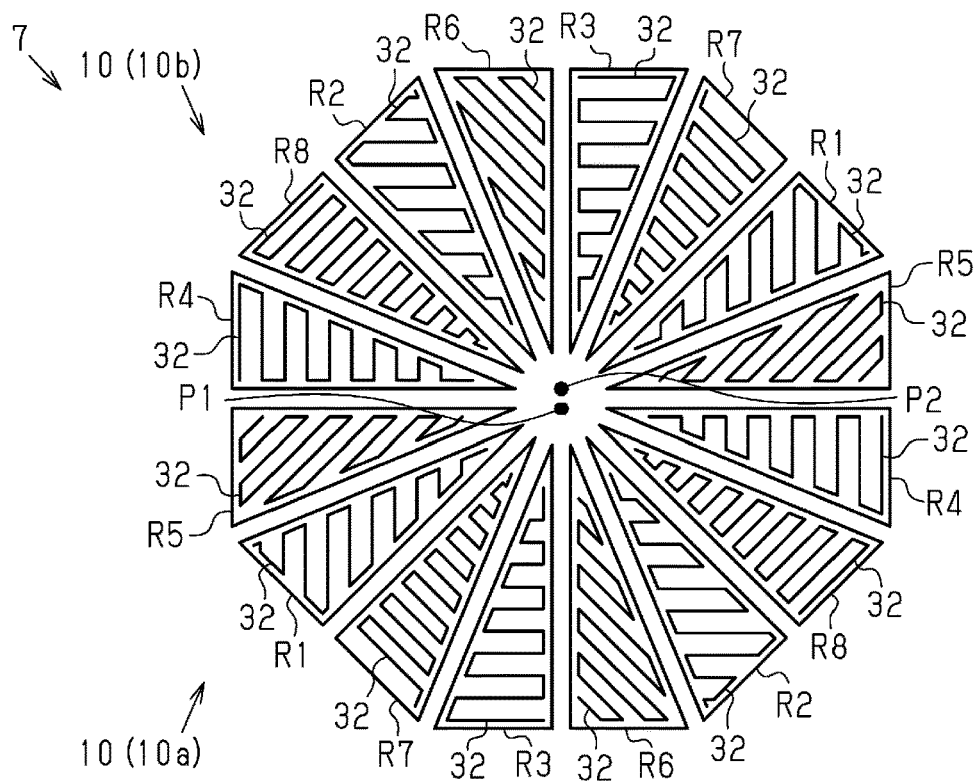
FIG. 7 is a diagram showing the layout of sensor elements in a magnetic sensor in accordance with a third embodiment.

As shown in FIG. 7, the magnetic sensor 7 is a dual system that includes two bridge pairs 10 (first bridge pair 10a, second bridge pair 10b). In the present example, the first bridge pair 10a is equivalent to the bridge pair 10 described in the first embodiment. The second bridge pair 10b has the same structure as the first bridge pair 10a and is arranged so that the element center P2 of the second bridge pair 10b is opposed toward the element center P1 of the first bridge pair 10a.

Figure 8:
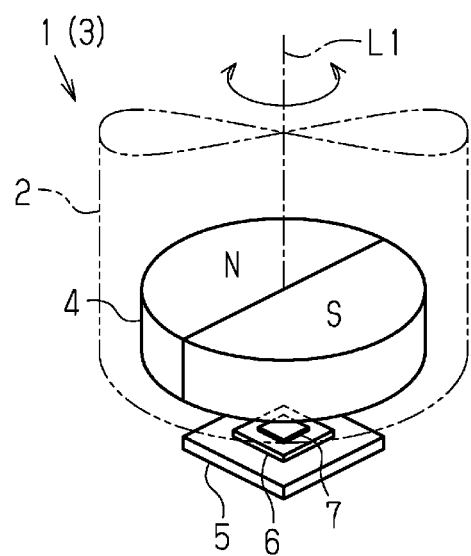
FIG. 8 is a diagram showing the structure of a position detector.

As shown in FIG. 8, when the bridge pairs 10 form a dual system, it is preferred that the rotation detector 3 be constructed so that the magnetic sensor 7 is disposed beside the magnet 4 in the axial direction. The magnet 4 is, for example, disc-shaped and concentric with the detected body 2. The magnet 4 has the north pole at one side and the south pole at the other side in a planar direction. Rotation of the detected body 2 and the magnet 4 about axis L1 changes the direction of the magnetic field (direction in which magnetic field extends) applied by the magnet 4 to the magnetic sensor 7.

The magnetic sensor 7 is arranged along the axis L1 of the rotation of the detected body 2 and the magnet 4. In the present example, as viewed in FIG. 8, the magnetic sensor 7 is located downward from the magnet 4. In this manner, the magnetic sensor 7 of the present example is disposed beside the magnet 4 in the axial direction. The magnetic sensor 7 detects changes in the direction of the magnetic field applied by the magnet 4 and outputs a detection signal Sa corresponding to the detected direction of the magnetic field.

The magnetic sensor 7 of the third embodiment has the following advantage in addition to advantages (1) to (4) of the first and second embodiments.

(5) The magnetic sensor 7 includes the first bridge pair 10a, which includes the first bridge circuit 11a and the second bridge circuit 11b, and the second bridge pair 10b, which is configured in the same manner as the first bridge pair 10a. The second bridge pair 10b is arranged so that the element center P2 of the second bridge pair 10b is opposed toward the element center P1 of the first bridge pair 10a. This allows the magnetic sensor 7 to have a dual system using two sensors of which the sensor elements 32 are arranged about the element center P along the circumference of part of a circle.

The above embodiments may be changed as described below. The above embodiments and the following modifications can be combined as long as the combined modifications remain technically consistent with each other.

Figure 9:
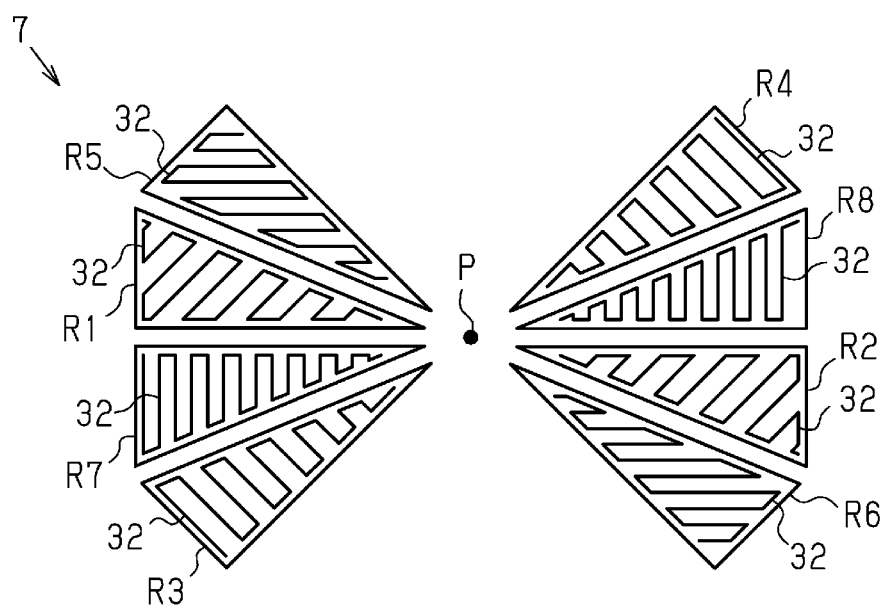
FIG. 9 is a diagram showing the layout of sensor elements in a magnetic sensor of a modified example.

In each embodiment, as shown in FIG. 9, the sensor elements 32 of the magnetic sensor 7 do not have to be arranged to form a semicircle and may be arranged to form a shape other than a semicircle. The example shown in FIG. 9 shows an arrangement pattern in which the first magnetoresistive element R1, the third magnetoresistive element R3, the fifth magnetoresistive element R5, and the seventh magnetoresistive element R7 form one collective body, and the second magnetoresistive element R2, the fourth magnetoresistive element R4, the sixth magnetoresistive element R6, and the eighth magnetoresistive element R8 form another collective body. Even when the magnetic sensor 7 has such an arrangement, the element center P can be closer to the magnet 4 than in a conventional arrangement.

In each embodiment, the bridge circuit 11 is not limited to a full-bridge circuit and may be a half-bridge circuit.

In each embodiment, the cycle of detection signal Sa is not limited to 180 degrees and may be, for example, 360 degrees.

In each embodiment, the first detection signal Sa1 and the second detection signal Sa2 may have a phase difference other than forty-five degrees.

In each embodiment, the first detection signal Sa1 is not limited to a sine-wave signal and may have other waveforms. Also, the second detection signal Sa2 is not limited to a cosine-wave signal and may have other waveforms.

In each embodiment, the magnetoresistive elements Rm of the first bridge circuit 11a and the second bridge circuit 11b do not have to be alternately arranged about the element center P. For example, the group of the magnetoresistive elements Rm of the first bridge circuit 11a may be arranged collectively, and the group of the magnetoresistive elements Rm of the second bridge circuit 11b may be arranged collectively.

In each embodiment, the sensor elements 32 may be arranged along part of the circumference of, for example, a circular sector instead of a semicircle. Accordingly, the sensor elements 32 may be arranged in any pattern as long as the pattern does not form an entire circumference.

In each embodiment, multiple bridge pairs 10 may be included.

In each embodiment, the position detector 1 is not limited to a device that detects rotation (rotation detector 3) and may be, for example, a device that detects linear movement of the detected body 2.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A magnetic sensor, comprising:
   a first bridge circuit arranged on a substrate and including a first group of magnetoresistive elements that are connected in a bridge, wherein the magnetoresistive elements are each formed by a sensor element bent in a serpentine manner, and the first bridge circuit outputs a first detection signal corresponding to a magnetic field detected by the magnetoresistive elements in the first group; and
   a second bridge circuit arranged on a substrate including a second group of magnetoresistive elements that are connected in a bridge, wherein the magnetoresistive elements are each formed by a sensor element bent in a serpentine manner, and the second bridge circuit outputs a second detection signal corresponding to a magnetic field detected by the magnetoresistive elements in the second group and having a waveform that has a sine-cosine relationship with the first detection signal,
   wherein the sensor elements of the first bridge circuit and the sensor elements of the second bridge circuit are arranged along a circumference of part of a circle about a center of the sensor elements,
   each of the magnetoresistive elements of the first and second bridge circuits has an end positioned around the center of the sensor elements, and
   the magnetic sensor is arranged so that an empty space extends between a detection edge of the substrate that is closest to a detected object and the center of the sensor elements to allow the center of the sensor elements to be closer to the detected object.

2. The magnetic sensor according to claim 1,
   wherein the sensor elements of the first bridge circuit and the sensor elements of the second bridge circuit are alternately arranged about the center of the sensor elements.

3. The magnetic sensor according to claim 1,
   wherein the sensor elements of the first bridge circuit and the sensor elements of the second bridge circuit are arranged along a semicircle about the center of the sensor elements.

4. The magnetic sensor according to claim 1,
wherein the sensor elements of the first bridge circuit and the sensor elements of the second bridge circuit are arranged to have a common centroid.

5. A magnetic sensor, comprising:
a first bridge pair including
  a first bridge circuit including a first group of magnetoresistive elements that are connected in a bridge,
  wherein the magnetoresistive elements are each formed by a sensor element bent in a serpentine manner, and the first bridge circuit has a first output terminal pair for outputting a first detection signal corresponding to a magnetic field detected by the magnetoresistive elements in the first group; and
  a second bridge circuit including a second group of magnetoresistive elements that are connected in a bridge,
  wherein the magnetoresistive elements are each formed by a sensor element bent in a serpentine manner, and the second bridge circuit has a second output terminal pair for outputting a second detection signal corresponding to a magnetic field detected by the magnetoresistive elements in the second group and having a waveform that has a sine-cosine relationship with the first detection signal, and
  wherein the sensor elements of the first bridge circuit and the sensor elements of the second bridge circuit are arranged along a semicircle about a first center of the sensor elements of the first bridge pair, and each of the magnetoresistive elements of the first and second bridge circuits has an end positioned around the first center of the sensor elements; and
a second bridge pair including the same configuration as the first bridge pair, the second bridge pair including
  a third bridge circuit including a third group of magnetoresistive elements that are connected in a bridge,
  wherein the magnetoresistive elements are each formed by a sensor element bent in a serpentine manner, and the third bridge circuit has a third output terminal pair for outputting a third detection signal corresponding to a magnetic field detected by the magnetoresistive elements in the third group; and
  a fourth bridge circuit including a fourth group of magnetoresistive elements that are connected in a bridge,
  wherein the magnetoresistive elements are each formed by a sensor element bent in a serpentine manner, and the fourth bridge circuit has a fourth output terminal pair for outputting a fourth detection signal corresponding to a magnetic field detected by the magnetoresistive elements in the fourth group and having a waveform that has a sine-cosine relationship with the third detection signal, and
  wherein the sensor elements of the third bridge circuit and the sensor elements of the fourth bridge circuit are arranged along a semicircle about a second center of the sensor elements of the second bridge pair, and each of the magnetoresistive elements of the third and fourth bridge circuits has an end positioned around the second center of the sensor elements, and
wherein the second center of the sensor elements of the second bridge pair is opposed toward the first center of the sensor elements of the first bridge pair.

* * * * *